(12) United States Patent
Moribe

(10) Patent No.: US 12,315,313 B2
(45) Date of Patent: May 27, 2025

(54) FACTOR ANALYSIS DEVICE, FACTOR ANALYSIS METHOD, AND NON-TRANSITORY COMPUTER-READABLE STORAGE MEDIUM

(71) Applicant: DENSO CORPORATION, Kariya (JP)

(72) Inventor: Atsushi Moribe, Kariya (JP)

(73) Assignee: DENSO CORPORATION, Kariya (JP)

( * ) Notice: Subject to any disclaimer, the term of this patent is extended or adjusted under 35 U.S.C. 154(b) by 214 days.

(21) Appl. No.: 18/146,856

(22) Filed: Dec. 27, 2022

(65) Prior Publication Data

US 2023/0128023 A1    Apr. 27, 2023

Related U.S. Application Data

(63) Continuation of application No. PCT/JP2021/024369, filed on Jun. 28, 2021.

(30) Foreign Application Priority Data

Jul. 1, 2020    (JP) ................................ 2020-114148

(51) Int. Cl.
  *G07C 5/08*    (2006.01)
(52) U.S. Cl.
  CPC ......... *G07C 5/0808* (2013.01); *G07C 5/0825* (2013.01)
(58) Field of Classification Search
  None
  See application file for complete search history.

(56) References Cited

U.S. PATENT DOCUMENTS

| | | | |
|---|---|---|---|
| 2006/0161391 A1* | 7/2006 | Inaba | G07C 5/0808 |
| | | | 702/183 |
| 2011/0166912 A1 | 7/2011 | Susumago | |
| 2011/0238258 A1* | 9/2011 | Singh | G07C 5/0808 |
| | | | 703/2 |
| 2014/0195184 A1 | 7/2014 | Maeda et al. | |
| 2017/0092021 A1* | 3/2017 | Nielsen | G07C 5/0808 |
| 2019/0130669 A1* | 5/2019 | Boggio | G05B 23/0254 |
| 2019/0243349 A1 | 8/2019 | Fujitsuka | |
| 2019/0266498 A1* | 8/2019 | Maluf | G05B 23/024 |
| 2019/0324430 A1* | 10/2019 | Herzog | G06Q 50/40 |
| 2021/0216962 A1* | 7/2021 | Lawson | G06Q 10/0833 |
| 2021/0357727 A1* | 11/2021 | Moribe | G06N 3/045 |
| 2022/0269841 A1* | 8/2022 | Muralidharan | G05B 23/0237 |

FOREIGN PATENT DOCUMENTS

| | | | |
|---|---|---|---|
| JP | 2007198918 A | | 8/2007 |
| JP | 2008215113 A | | 9/2008 |
| JP | 2011141658 A | | 7/2011 |
| JP | 2013041448 A | | 2/2013 |
| JP | 2019021084 A | | 2/2019 |
| JP | 2020035407 A | | 3/2020 |
| WO | WO-2018083720 A1 | | 5/2018 |
| WO | WO-2020162069 A1 | | 8/2020 |

* cited by examiner

*Primary Examiner* — Peter D Nolan
*Assistant Examiner* — Jacob Kent Besteman-Street
(74) *Attorney, Agent, or Firm* — Harness, Dickey & Pierce, P.L.C.

(57) ABSTRACT

A normal model is acquired from a memory. A monitoring target data for each of a plurality of systems is acquired. A distance between the normal model and a value based on the monitoring target data for each of the plurality of systems is calculated. A system that provides an anomaly factor is identified from among the plurality of systems based on the distance.

7 Claims, 12 Drawing Sheets

FACTOR ANALYSIS DEVICE, FACTOR ANALYSIS METHOD, AND NON-TRANSITORY COMPUTER-READABLE STORAGE MEDIUM

CROSS REFERENCE TO RELATED APPLICATIONS

The present application is a continuation application of International Patent Application No. PCT/JP2021/024369 filed on Jun. 28, 2021, which designated the U.S. and claims the benefit of priority from Japanese Patent Application No. 2020-114148 filed on Jul. 1, 2020. The entire disclosures of all of the above applications are incorporated herein by reference.

TECHNICAL FIELD

The present disclosure relates to a device for analyzing a factor of anomaly in equipment.

BACKGROUND

In recent years, it has been proposed that an abnormalities of various instruments are detected using machine learning. An anomaly monitoring device according to a conceivable technique diagnoses the presence or absence of an anomaly in equipment such as rotating equipment. Specifically, the anomaly monitoring device uses a competitive neural network to evenly learn the actual sensor observation values, so that, even when there is variation in the normal state due to rotation speed, aging deterioration, date and time, season, and the like, the presence or absence of abnormalities is properly diagnosed.

SUMMARY

According to an example, a normal model is acquired from a memory. A monitoring target data for each of a plurality of systems is acquired. A distance between the normal model and a value based on the monitoring target data for each of the plurality of systems is calculated. A system that provides an anomaly factor is identified from among the plurality of systems based on the distance.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
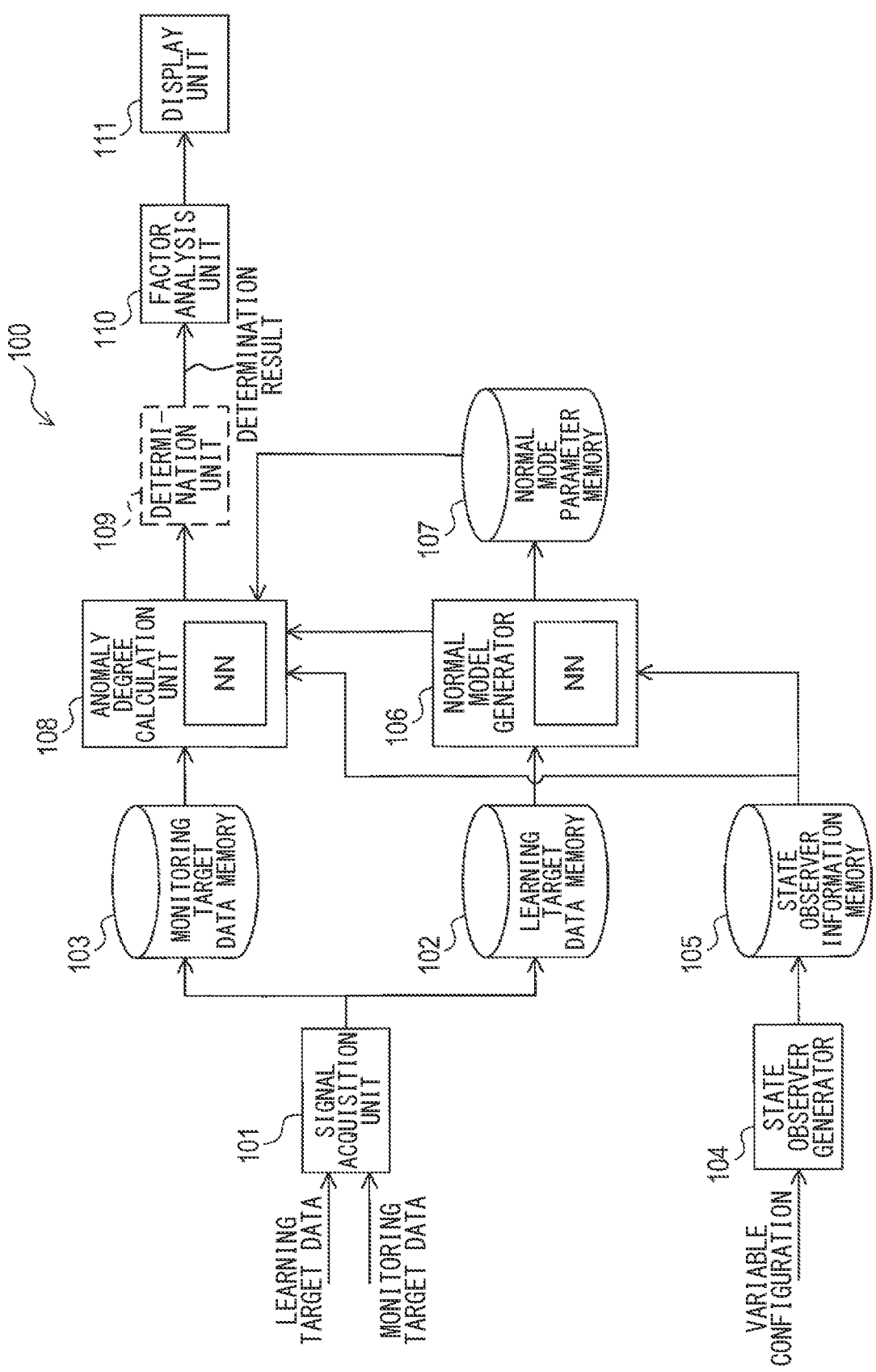
FIG. 1 is a block diagram illustrating the configuration of a factor analysis device according to a first embodiment of the present embodiments.

As a result of detailed examination by the inventor, it is found that, when an anomaly is detected in a device, it is necessary to analyze the factors contributing to the anomaly for quality control of the device.

According to the present embodiments, it may be desirable to provide a factor analysis device capable of appropriately analyzing anomaly factors.

A factor analysis device according to the present embodiments includes a model acquisition unit, a monitoring target data acquisition unit, a distance calculation unit, and a factor analysis unit. The model acquisition unit is configured to acquire a normal model stored in the storage device. The monitoring target data acquisition unit is configured to acquire monitoring target data of each of the plurality of systems that the device has. The distance calculation unit is configured to calculate, for each of the plurality of systems, the distance between the normal model and the value based on the monitoring target data. The factor analysis unit is configured to identify, from among the plurality of systems, the system that is the cause of the anomaly based on the distance calculated by the distance calculation unit.

According to the factor analysis device of the present embodiments, the distance between the normal model and the value based on the monitoring target data is calculated for each system. The calculated distance corresponds to the amount of deviation of each system from the normal model. In other words, among the plurality of systems, a system with a relatively large distance has a relatively large amount of deviation from the normal model, and corresponds to a factor that greatly contributes to the overall anomaly. Therefore, it is possible to appropriately analyze the anomaly factor based on the calculated distance of each system.

A factor analysis method according to the present embodiments includes: acquiring a normal model from a storage device; acquiring monitoring target data for each of a plurality of systems; calculating a distance between the normal model and the value based on the monitoring target data for each of a plurality of systems; and identifying one of the plurality of systems that has the anomaly factor according to the distance.

According to the factor analysis method of the present embodiments, the same effects as those of the factor analysis device described above can be obtained.

According to a factor analysis program of the present embodiments, the program executed by a computer provides: acquiring a normal model from a storage device; acquiring monitoring target data for each of a plurality of systems; calculating a distance between the normal model and the value based on the monitoring target data for each of a plurality of systems; and identifying one of the plurality of systems that has the anomaly factor according to the distance.

According to the factor analysis program of the present embodiments, the same effects as those of the factor analysis device described above can be obtained.

Hereinafter, exemplary embodiments for implementing the present disclosure will be described with reference to the drawings.

First Embodiment

<1-1. Configuration of Factor Analysis Device>

First, the configuration of a factor analysis device 100 according to this embodiment will be described with reference to FIG. 1. In the present embodiment, a vehicle factor analysis device mounted on a vehicle will be described as an example, alternatively, the present disclosure may also include a vehicle factor analysis device other than the in-vehicle device. As a factor analysis device for a vehicle other than an in-vehicle device, for example, there is a factor analysis device provided outside the vehicle and connected to a connected ECU of the vehicle by wire or wirelessly. In addition, the devices of the present disclosure may not be limited to vehicles, and may include devices other than vehicles. The "anomaly" in the present disclosure includes not only abnormalities that have already occurred, but also abnormalities that are anticipated to occur.

The factor analysis device 100 mainly includes a computer including a CPU, a ROM, a RAM, an I/O, and the like, and provides functions of a signal acquisition unit 101, a learning target data memory 102, a monitoring target data memory 103, a state observer generator 104, a state observation information memory 105, a normal model generator 106, a normal model parameter memory 107, an anomaly degree calculation unit 108, a factor analysis unit 110, and a display unit 111. Details of each function will be described later.

The factor analysis device 100 calculates the degree of anomaly of each system using the monitoring target data and the normal model of each system of the vehicle, and analyzes which system is the cause of the anomaly of the vehicle. The system here corresponds to a unit for each function of the vehicle. In other words, a group of control devices, sensors, and the like that constitute a vehicle is defined as a system for each function. The multiple systems of the vehicle include, for example, an ignition control system, a fuel control system, an air measurement system, an air-fuel ratio measurement system, a throttle measurement system, an air control system, a drive measurement system, and the like.

<1-2. Processing>
<1-2-1. Learning Process>

Figure 2:
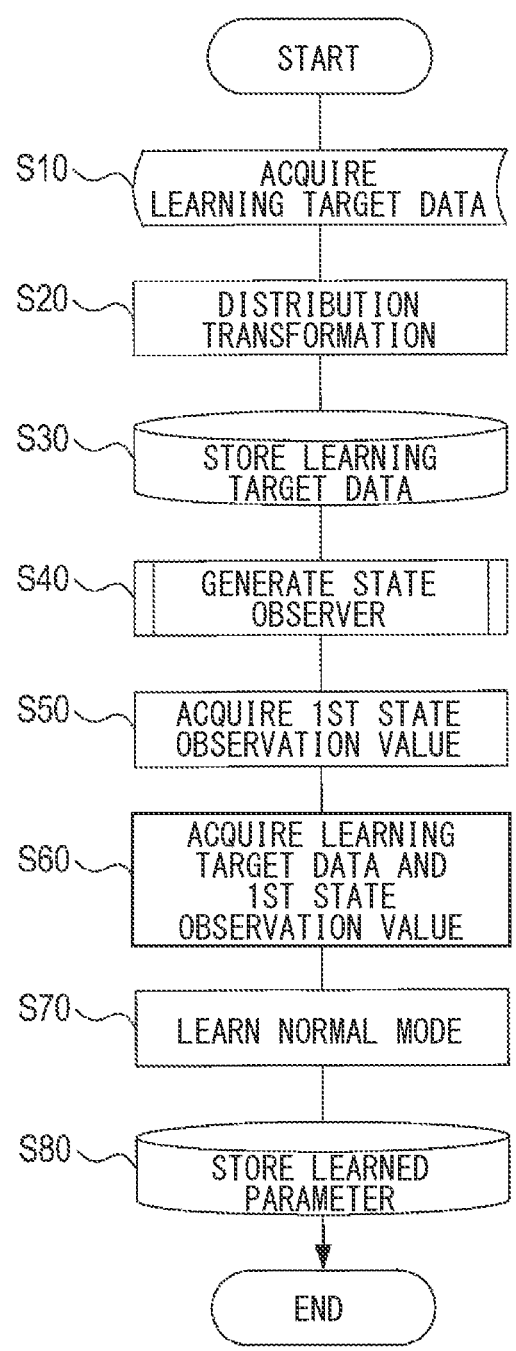
FIG. 2 is a flowchart showing a learning process according to the first embodiment of the present embodiments.

Next, the learning process executed by the factor analysis device 100 will be described with reference to the flowchart of FIG. 2.

First, in S10, the signal acquisition unit 101 acquires learning target data. The learning target data is data related to vehicle failures and/or failure mechanisms, and includes data related to vehicles, data related to driving environments, and the like. The learning target data is data in the normal state of the vehicle. That is, the learning target data is data relating to vehicle failures and/or failure mechanisms when there is no anomaly in the vehicle.

The signal acquisition unit 101 acquires the learning target data from various sensors directly or indirectly connected to the factor analysis device 100. Alternatively, the signal acquisition unit 101 may indirectly acquire the learning target data via a network. For example, the signal acquisition unit 101 may acquire the learning target data by downloading from a database via a network.

Various sensors include, for example, sensors mounted on a vehicle such as thermometers, hygrometers, and GPS. Further, the various sensors include sensors connected to various vehicle electronic control units, such as engine rotation sensors, turbine rotation sensors, voltage sensors, and air-fuel ratio sensors.

Vehicle-related data included in the learning target data includes, for example, engine speed, turbine speed, oxygen sensor voltage, air-fuel ratio sensor current and the like. Further, the data related to the driving environment included in the learning target data includes, for example, temperature, humidity, positional information, and the like.

Subsequently, in S20, the signal acquisition unit 101 performs distribution transformation to bring the learning target data acquired in S10 closer to a normal distribution. Examples of distribution transformation include Box-Cox transformation and Johnson transformation. By executing the distribution transformation, the calculation accuracy of the degree of anomaly for each system is improved.

Subsequently, in S30, the signal acquisition unit 101 stores the distribution-transformed learning target data in the learning target data memory 102. The learning target data memory 102 provides a database that stores learning target data. In this embodiment, various databases including a database to be described later may be provided by a hard disk, a flash memory, or a RAM. Also, the various databases may be provided by either volatile memory or non-volatile memory.

Figure 3:
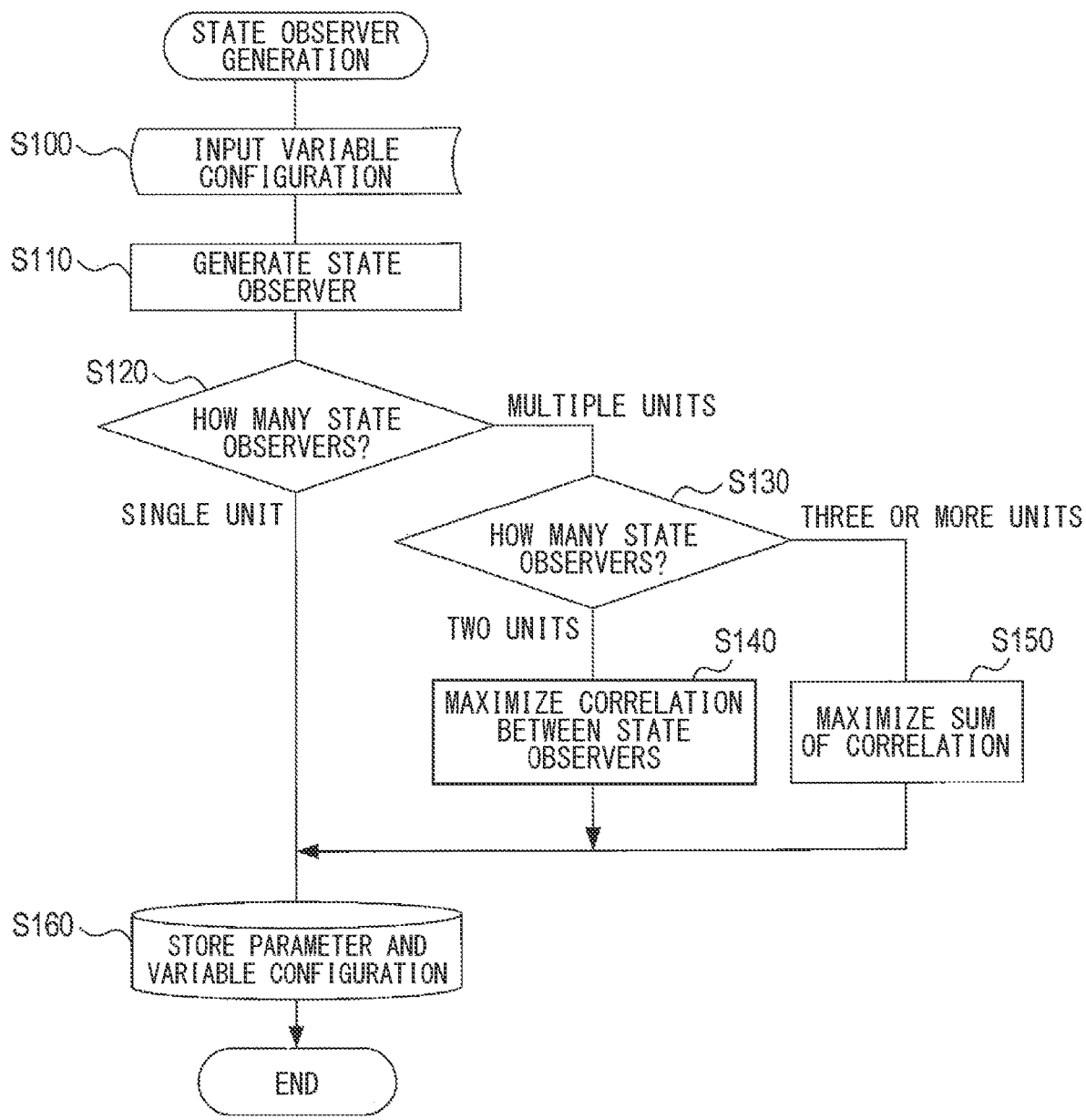
FIG. 3 is a flowchart showing a process for generating a state observer according to the first embodiment of the present embodiments.

Subsequently, in S40, the state observer generator 104 generates a state observer. The state observer is also defined as an observation unit or a soft sensor. Specifically, the state observer generator 104 generates a state observer based on the flowchart shown in FIG. 3.

First, in S100, a variable configuration is input to the state observer generator 104. The variables correspond to learning target data acquired by the signal acquisition unit 101 and monitoring target data described later. The state observer generator 104 may be configured to input a variable configuration necessary or useful for the state observer to express vehicle functions and failure mechanisms based on the knowledge of the setter. The details of the state observer and the variables constituting the state observer will be described later. Note that the variable configuration here corresponds to one variable or a combination of multiple variables.

Next, in S110, the state observer generator 104 generates a state observer for each system using variables included in the variable configuration. Specifically, the state observer generator 104 generates a state observer by linearly combining variables included in the input variable configuration for each system, as shown in Equation (1). Note that A is a coefficient, X is a variable, p is a state observer number, n is a variable number, and A_pS_p corresponds to the p-th state observer (that is, a state observation value). The initial value of the coefficient A is set to a random value, and the variable X is combined with the initial value of the coefficient A to generate the initial value of the state observer. The variable X corresponds to learning target data of each system.

(Equation 1)

$$A\_p*S\_p = A\_p1*X\_p1 + A\_p2*X\_p2 + \ldots + A\_pn*X\_pn \quad (1)$$

It may be desirable that the state observer reflects the function of the device as an analysis target by the factor analysis device 100 or the failure mechanism of the device. In this embodiment, examples of device functions include a vehicle drive system and a vehicle air-fuel ratio system. In addition, the device failure mechanism corresponds to the mechanism by which the device failure occurs. Further, the feature that the state observation value output from the state observer changes according to the function of the device or the failure mechanism of the device corresponds to reflection of the failure mechanism of the device.

The variables included in the variable configuration of the state observer may be desirably the functions of the device as the analysis target by the factor analysis device 100 or the factors of the failure mechanism of the device. For example, as an example of an device failure mechanism, if the device failure is engine overheating, engine temperature is the direct factor causing overheating. In addition, the number of rotations of the engine and the amount of coolant are direct factors that cause an increase in engine temperature, that is, indirect factors that cause overheating. The learning target data corresponds to data obtained by acquiring the values of these direct and indirect factors using various sensors and the like.

Figure 4:
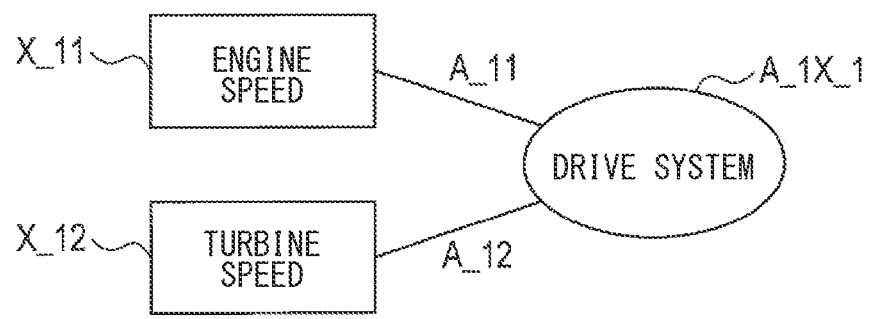
FIG. 4 is a diagram illustrating an example of a state observer according to the first embodiment of the present embodiments.

For example, as shown in FIG. 4, when the first state observer is generated with the function of the device as the drive system of the vehicle, the variables X_11 and X_12 correspond to the engine speed and the turbine speed, for example. In this case, by linearly combining the variables X_11 and X_12 as shown in Equation (2), the drive system state observer U is generated as the first state observer.

(Equation 2)

$$U = A\_1*X\_1 = A\_11*X\_11 + A\_12*X\_12 \quad (2)$$

Figure 5:
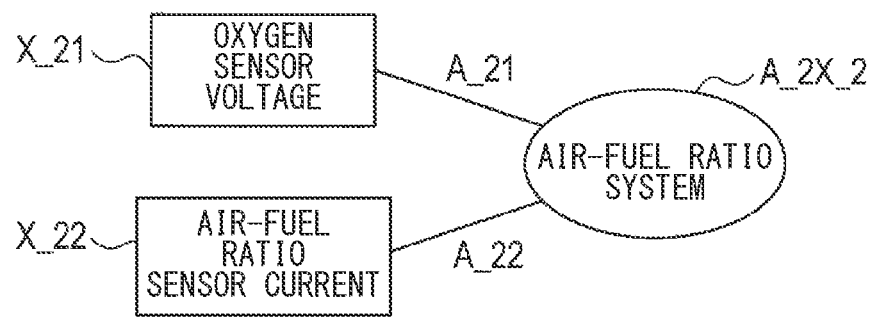
FIG. 5 is a diagram showing another example of a state observer according to the first embodiment of the present embodiments.

Also, as shown in FIG. 5, when the second state observer is generated with the function of the device as an air-fuel ratio system, the variables X_21 and X_22 correspond to, for example, the oxygen sensor voltage value and the air-fuel ratio sensor current value. In this case, the air-fuel ratio system state observer T is generated as the second state observer by linearly combining the variable X_21 and the variable X_22 as shown in equation (3).

(Equation 3)

$$T = A\_2*X\_2 = A\_21*X\_21 + A\_22*X\_22 \quad (3)$$

Of course, variables other than those mentioned above may be used to generate the state observer. Also, the number of variables to be combined may not be limited to two, and may be three or more. Furthermore, the number of state observers to be generated may not be limited to two, and may be one or three or more.

In the present embodiment, as the example of the state observer, the state observer having the two-layer structure of input and output has been described. Alternatively, the number of layers may be three or more. In the case of three or more layers, a hierarchical neural network may be used for description.

The example in which the variables as the state observer are linearly combined has been described. Alternatively, it may not be limited to this feature. The state observer may be configured by non-linear combination. For example, when it is described using the hierarchical neural network, a sigmoid function is used. Therefore, the state observer is configured by the non-linear combination.

It is possible to estimate the state observation value that cannot be measured directly by the sensor and the like, by generating the state observer. In addition, by reflecting the function and failure mechanism of the device in the state observer, it becomes easier to analyze the cause of the failure.

Subsequently, in S120, the state observer generator 104 determines whether the number of state observers generated in S110 is one or two or more. If it is determined in S120 that there is one state observer, the process proceeds to S160, and if it is determined that there are two or more state observers, the process proceeds to S130.

Subsequently, in S130, the state observer generator 104 determines whether the number of state observers generated in S110 is two or three or more. If it is determined in S130 that there are two state observers, the process proceeds to S140, and if it is determined that there are three or more state observers, the process proceeds to S150.

In S140, the state observer generator 104 maximizes the correlation between the two generated state observers. Specifically, as shown in equations (4) and (5), the correlation is maximized by adjusting the coefficients of the first state observer and the second state observer. Here, n and m are the numbers of the state observers, and V is the variance. The numerator of equation (4) is the sample covariance of the first state observer and the second state observer, and each part of the denominator of equation (4) is the sample variance of the first state observer and the sample variance of the second state observer, respectively. Equation (5) is a constraint condition of the Lagrangian undetermined multiplier method, and the constraint condition is 1 in this embodiment.

(Equation 4)

$$\rho(A\_nA\_m) = \frac{A\_n^T V\_nm A\_n}{\sqrt{A\_n^T V\_nn A\_n} \sqrt{A\_m^T V\_mm A\_m}} \quad (4)$$

(Equation 5)

$$A\_n^T = A\_n^T X\_n^T X\_n A\_n = \\ A\_m^T V\_mm\_Am = A\_m^T X\_m^T X\_m A\_m = 1 \quad (5)$$

Figure 6:
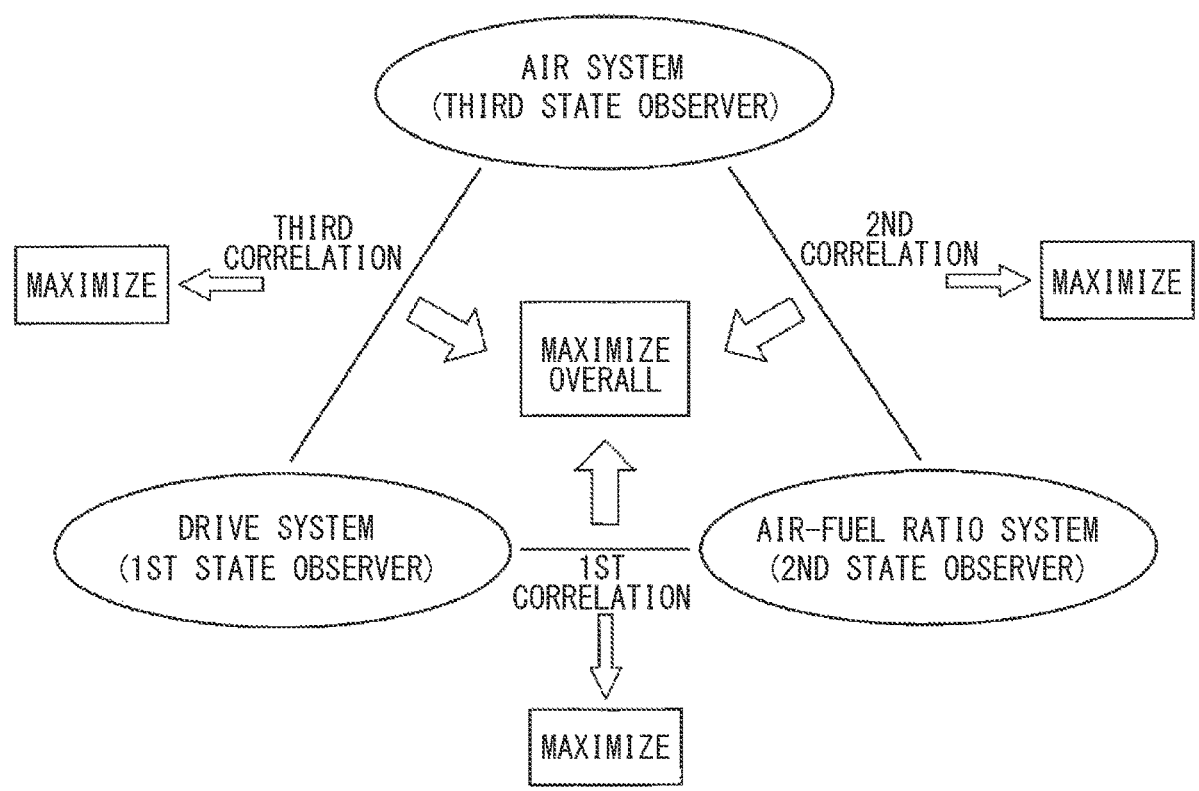
FIG. 6 is an explanatory diagram illustrating maximization of correlation between state observers according to the first embodiment of the present embodiments.

In S150, the state observer generator 104 maximizes the correlation between the three or more generated state observers. For example, if a first state observer, a second state observer and a third state observer have been generated, it may be desirable to maximize the sum of the correlations between two state observers as shown in FIG. 6. Specifically, equation (6) is used to maximize the sum of the correlations between two state observers. N is the total number of state observers. g is a function representing the sum, and the contents inside the parentheses of g are the targets of the sum. Also in the case of the four or more state observers, maximization is performed in the similar manner to the manner in the case of three. In this embodiment, the "sum" may be a simple sum, a sum of squares, a sum of absolute values, or the like, as long as the sum is included in the calculation.

(Equation 6)

$$\text{Maximize}(A\_1, \quad . \quad . \quad . \quad A\_N) \Sigma_{n,m=1,n \neq m}^{N} g \\ (A\_n^T X\_n^T X\_m A\_m) \tag{6}$$

In S160, the state observer generator 104 associates the calculated coefficients and variable configurations of the state observer with the distribution transformation parameters used in S20, and stores them in the state observer information memory 105, which provides a database.

The state observer generator 104 at least only needs to be provided when generating the state observer. The state observer 104 may be separated from the factor analysis device 100 after generating the state observer once and storing the coefficients and variable configurations of the state observer in the state observer information memory 105.

Subsequently, returning to FIG. 2, in S50, the normal model generator 106 acquires the first state observation value. Specifically, the normal model generator 106 reads the learning target data from the learning target data memory 102 and reads the variable configuration and coefficients of the state observer from the state observer information memory 105. Then, the normal model generator 106 calculates the first state observation value by assigning the read learning target data to the read variable for each system.

For example, the normal model generator 106 substitutes the engine speed and the turbine speed obtained as learning data into the equation (2) to calculate the drive system state observation value U1 as the first state observation value. Further, the normal model generator 106 substitutes the oxygen sensor voltage value and the air-fuel ratio sensor current value acquired as learning data into the equation (3) to calculate the air-fuel ratio state observed value T1.

Subsequently, in S60, the normal model generator 106 combines the first state observation value acquired in S50 and the learning target data. For example, six data of the engine speed, the turbine speed, the drive system state observation value U1, the oxygen sensor voltage value, the air-fuel ratio sensor current value, and the air-fuel ratio system state observation value T1 are combined. Here, the meaning of the term of "combine" includes at least a feature such that the first state observation value and the learning target data can be input to the competitive neural network at the same time.

Subsequently, in S70, the normal model generator 106 learns a normal plane as a normal model by inputting the data combined in S60 to the competitive neural network. A competitive neural network is a network with two layers, i.e., an input layer and an output layer, and includes multiple input layer neurons and multiple output layer neurons that are fully connected to the input layer neurons. The weight data of each output layer neuron corresponds to the normal surface.

The initial value to be given to the competitive neural network may be desirable to evenly sample or randomly sample the multiple combinations when, for example, there are multiple combinations of attributes of the input data, such as a vehicle type, a measurement season, day and night, customization specifications, and number of years. Thereby, it is possible to accelerate the convergence at the time of learning a neuron weight vector on a map of the competitive neural network.

Subsequently, in S80, the normal model generator 106 stores the learned parameters such as the normal surface learned in S70 in the normal model parameter memory 107, which provides a database. Thus, the process is completed.

<1-2-2. Factor Analysis Process>

Figure 7:
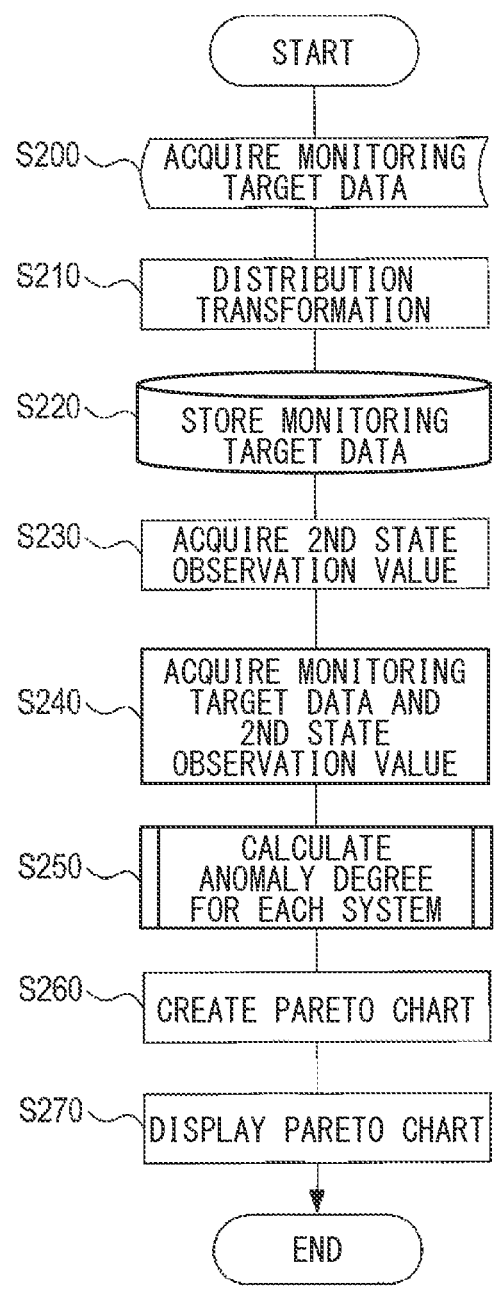
FIG. 7 is a flowchart showing a factor analysis process according to the first embodiment of the present embodiments.

Next, the factor analysis process executed by the factor analysis device 100 will be described with reference to the flowchart of FIG. 7. In this embodiment, the factor analysis device 100 executes this process at a predetermined cycle.

First, in S200, the signal acquisition unit 101 acquires monitoring target data. The monitoring target data is data that is not limited to when the vehicle is in a normal state, and is of the same type as the learning target data. The signal acquisition unit 101 acquires monitoring target data through various sensors and/or networks in the same manner as learning target data. In this embodiment, the monitoring target data is time-series data.

Subsequently, in S210, the signal acquisition unit 101 reads distribution conversion parameters from the state observer information memory 105. Then, the signal acquisition unit 101 uses the read distribution transformation parameter to perform distribution transformation to bring the monitoring target data acquired in S200 closer to a normal distribution.

Subsequently, in S220, the signal acquisition unit 101 stores the distribution-converted monitoring target data in the monitoring target data memory 103, which provides a database.

Subsequently, in S230, the anomaly degree calculation unit 108 acquires a second state observation value. Specifically, the anomaly degree calculation unit 108 reads the monitoring target data from the monitoring target data memory 103 and reads the variable configuration and coefficients of the state observer from the state observer information memory 105. Then, the anomaly degree calculation unit 108 calculates the second state observation value by assigning the read learning target data to the read variable for each system.

For example, the anomaly degree calculation unit 108 substitutes the engine speed and the turbine speed obtained as learning data into the equation (2) to calculate the drive system state observation value U2 as the second state observation value. Further, the anomaly degree calculation unit 108 substitutes the oxygen sensor voltage value and the air-fuel ratio sensor current value acquired as learning data into the equation (3) to calculate the air-fuel ratio state observed value V2.

Subsequently, in S240, the anomaly degree calculation unit 108 combines the second state observation value acquired in S230 and the monitoring target data. For example, six data of the engine speed, the turbine speed, the drive system state observation value U2, the oxygen sensor voltage value, the air-fuel ratio sensor current value, and the air-fuel ratio system state observation value V2 are combined.

Subsequently, in S250, the anomaly degree calculation unit 108 reads normal planes, that is, learned parameters such as neuron weight data from the normal model parameter memory 107. Then, the anomaly degree calculation unit 108 inputs the data combined in S240 to the competitive neural network, so that the distance between the monitoring target data and the second state observation value and the normal plane is calculated as the anomaly degree for each system. In other words, the deviation between the monitoring target data and the second state observation value and the normal plane is represented by the distance and is defined as the anomaly degree. Specifically, the anomaly degree calculation unit 108 calculates the anomaly degree of each system at time k based on the flowchart shown in FIG. 8. Below, the monitoring target data and the second state observation value are collectively referred to as verification data.

Figure 8:
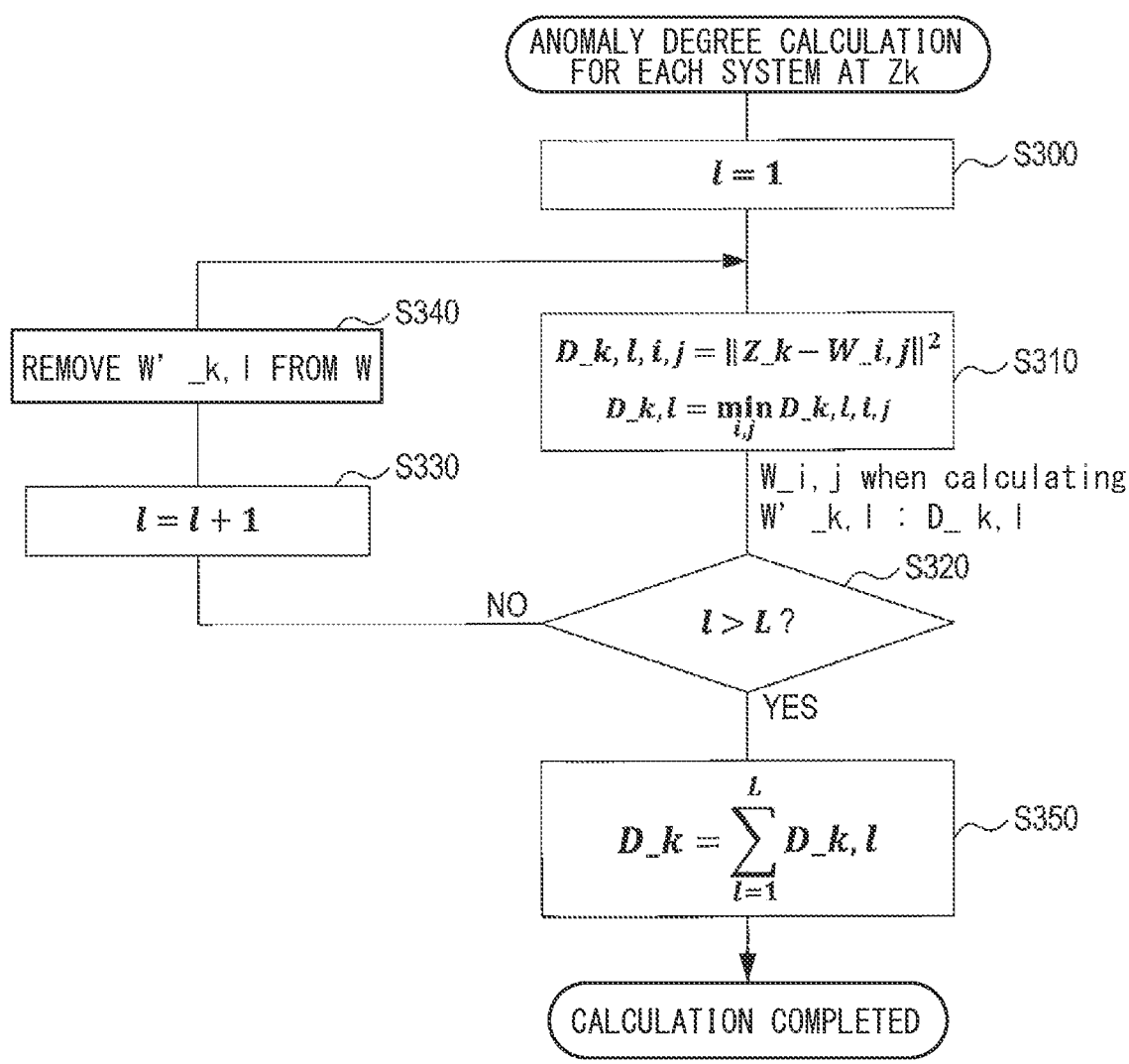
FIG. 8 is a flowchart showing an anomaly degree calculation process for each system according to the first embodiment of the present embodiments.

In FIG. 8, the following equations are adopted.

$$W=(W\_1.1, \ldots W\_1,M,W\_2,1, \ldots W\_i,j, \ldots, \ldots, W\_N,M)$$

$$W\_i,j=(W\_i,j,1,W_i,j,2,\ldots,W_i,j,X)^T$$

$$Z\_k=(Z\_k,1,Z\_k,2,\ldots,Z\_k,X)^T$$

$$D\_k=(D\_k,1,D\_k,2,\ldots,D\_k,X)^T$$

Here, k indicates a measurement time point. N indicates a lateral size of a map. M indicates a vertical size of the map. X indicates an anomaly system axis (e.g., an anomaly degree of an ignition system.

First, in S300, the anomaly degree calculation unit 108 sets 1 to the loop counter l.

Subsequently, in S310, the anomaly degree calculation unit 108 calculates the verification data Z_k at the monitoring point k and the Euclidean distance D_k,l,i,j between the verification data Z_k and the weight data W_i,j of each neuron. Here, i is an integer from 1 to N, and N indicates the lateral size of the normal surface. j is an integer from 1 to M, and M indicates the vertical size of the normal surface. W_i,j is a vector with X elements, where X denotes the total number of systems. Each element of W_i,j corresponds to the weight of the neuron of each system.

Then, the anomaly degree calculation unit 108 calculates the minimum Euclidean distance D_k,l from among the calculated Euclidean distances D_k,l,i,j. The calculated minimum Euclidean distance D_k,l is a vector with X elements. Each element of the minimum Euclidean distance D_k,l corresponds to the amount of deviation from the normal value of each system, that is, the anomaly degree.

Subsequently, in S320, the anomaly degree calculation unit 108 determines whether the loop counter l exceeds the predetermined value L or not. The predetermined value L may be set arbitrarily, and is set to 10 times, for example. In S320, when the loop counter l is equal to or less than the predetermined value L, the anomaly degree calculation unit 108 proceeds to the process of S330, and when it determines that the loop counter l exceeds the predetermined value L, the process proceeds to the process of S350.

In S330, the anomaly degree calculation unit 108 increments the loop counter l and updates it to l+1.

Subsequently, in S340, the anomaly degree calculation unit 108 removes the neuron weight W'_k,l from the set W of neuron weights. A set W of neuron weights is a matrix with N×M elements which include from W_1,1 to W_1, M, from W2.1 to W_2. M, from W_3,1 to W_3, M, . . . and from W_N,1 to W_N,M. The neuron weight W'_k,l is the weight of the neuron closest to the verification data when calculating D_k,l.

After the process of S340, the anomaly degree calculation unit 108 returns to the process of S310 and repeatedly executes the processes of S310 to S340. That is, the anomaly degree calculation unit 108 calculates the Euclidean distance D_k,l,i,j between the verification data Z_k and the weight data W_i,j of each neuron in the weight set W of neurons. The neuron weight set W here is a set from which the neuron weight W'_k,l has been removed. Then, the anomaly degree calculation unit 108 calculates the minimum Euclidean distance D_k,l from among the calculated Euclidean distances D_k,l,i,j.

Then, the anomaly degree calculation unit 108 repeats the process of S310 to S340 until the loop counter l exceeds the predetermined value L. As a result, L minimum Euclidean distances D_k,l are calculated in ascending order from the Euclidean distances D_k,l,i,j.

Figure 9:
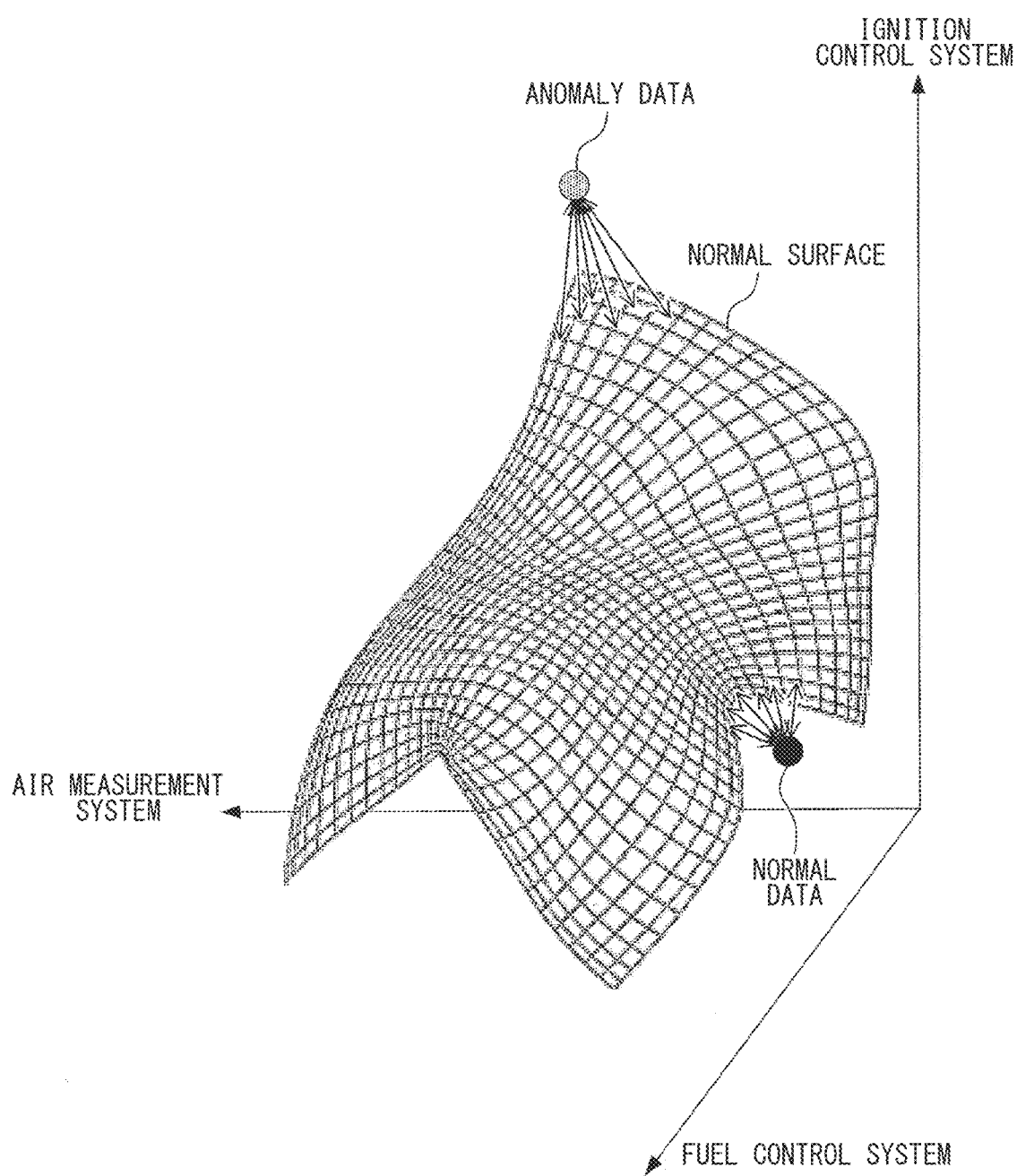
FIG. 9 is a diagram showing the distance between a normal plane and abnormal data and the distance between a normal plane and normal data according to the first embodiment of the present embodiments.

Then, in S350, the anomaly degree calculation unit 108 totals the L minimum Euclidean distances D_k,l to calculate the distance D_k at time k. The distance D_k is a vector having X elements, and each element corresponds to the anomaly degree of each system. As shown in FIG. 9, the data of the normal system among the verification data Z_k has a relatively small distance from the normal surface. On the other hand, the abnormal system data in the verification data Z_k has a relatively large distance from the normal surface.

Figure 10:
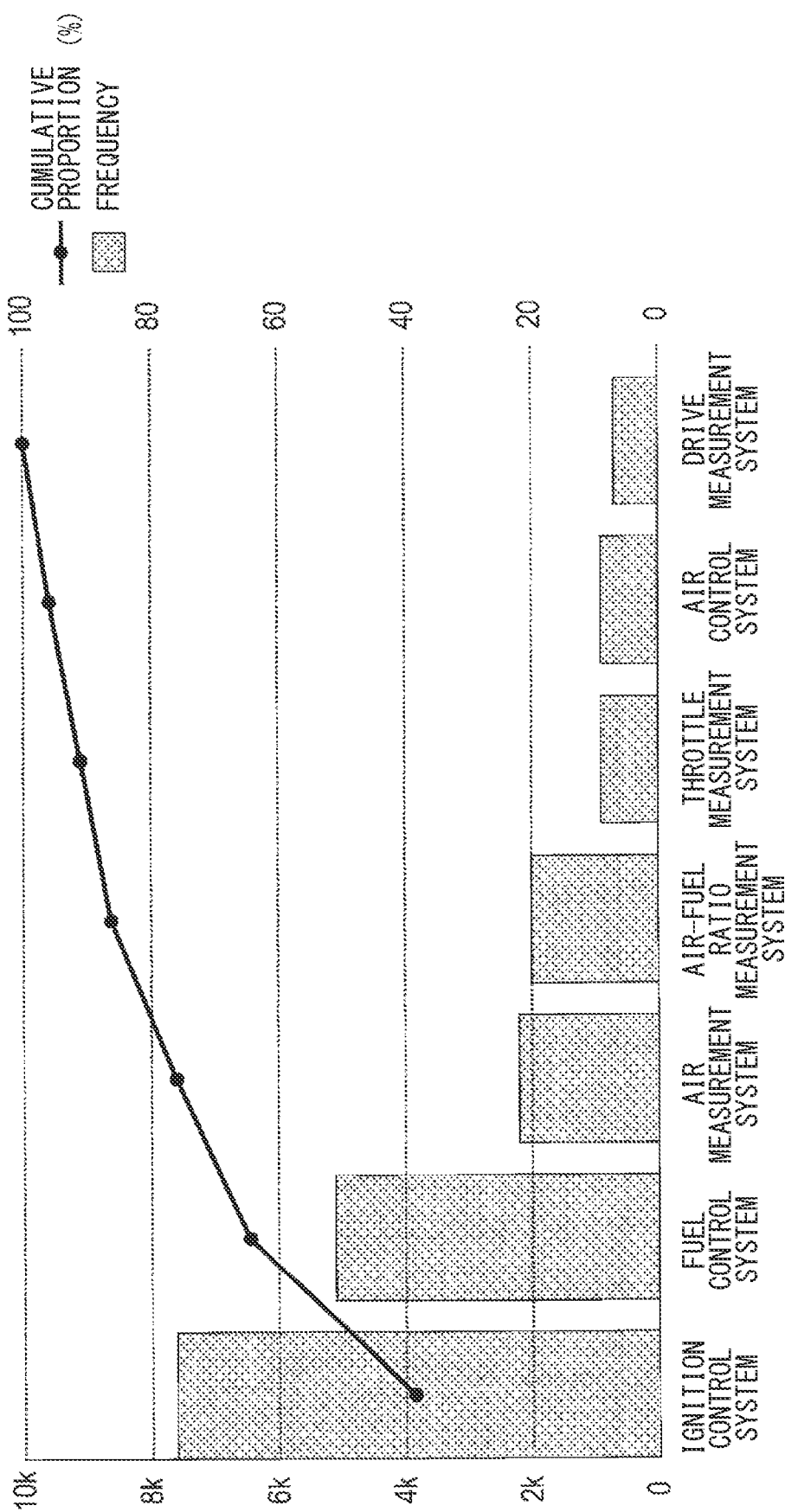
FIG. 10 is a Pareto chart based on the distance between a normal plane and data of each system according to the first embodiment of the present embodiments.

Subsequently, returning to FIG. 7, at S260, the factor analysis unit 110 creates a Pareto chart as shown in FIG. 10 based on the distance D_k calculated at S350. Specifically, for each of the plurality of systems, the factor analysis unit 110 calculates the difference between the distance D_k of each system and the distance D_k of each of the remaining systems, adds the calculated differences, and obtains the sum of the differences. The factor analysis unit 110 creates a Pareto chart using the calculated sum of differences. The Pareto chart includes frequencies and cumulative proportions for each system.

Furthermore, the factor analysis unit 110 identifies the system that is the cause of the anomaly from among the plurality of systems. For example, the factor analysis unit 110 may determine from the highest frequency system to the L2-th highest frequency system among the plurality of systems to be the anomaly factor. Alternatively, the factor analysis unit 110 may determine from the highest frequency system to the L2-th highest frequency system, which have the frequency equal to or higher than the frequency threshold to be the anomaly system. Here, "anomaly" includes not only an anomaly that has occurred, but also a sign of an anomaly. L2 and L3 are natural numbers.

Subsequently, the display unit 111 displays the Pareto chart created in S260 on the display. This process is completed.

<1-3. Effects>

According to the first embodiment described above, the following effects can be exhibited.

(1) The distance D_k between the normal plane and the verification data is calculated for each of the plurality of systems. The calculated distance D_k corresponds to the amount of deviation of each system from the normal surface. In other words, among the plurality of systems, a system with a relatively large distance D_k has a relatively large amount of deviation from the normal model, and corresponds to a factor that greatly contributes to the overall anomaly. Therefore, it is possible to analyze the anomaly factor based on the calculated distance of each system.

(2) By displaying a Pareto chart based on the distance D_k of each system, the user can easily recognize how much each system contributes to the anomaly of the entire system.

(3) By using a state observer and a competitive neural network, it is possible to generate a normal plane that reflects the function and failure mechanism of the device. Furthermore, by calculating the distance D_k between this normal plane and the verification data, it is possible to analyze with high accuracy which system of the device has an anomaly or has a possibility to occur an anomaly. As a result, anomaly factors can be analyzed with high accuracy.

Second Embodiment

<3-1. Differences from First Embodiment>

Since basic configuration of a second embodiment is the same as that of the first embodiment, the description of the common configuration will not be made, and the description will be made on the differences. The same reference numerals as in the first embodiment denote the same components, and reference is made to the preceding description.

In the above-described first embodiment, the anomaly factor is specified by calculating the degree of anomaly of each system. On the other hand, the second embodiment differs from the first embodiment in that the overall anomaly degree of the entire system is calculated and the anomaly factor is specified when the overall anomaly degree exceeds the anomaly threshold. Specifically, as indicated by the dashed line in FIG. 1, the factor analysis device 100 according to the second embodiment further includes a determination unit 109.

<2-2. Anomaly Determination Process>

Figure 11:
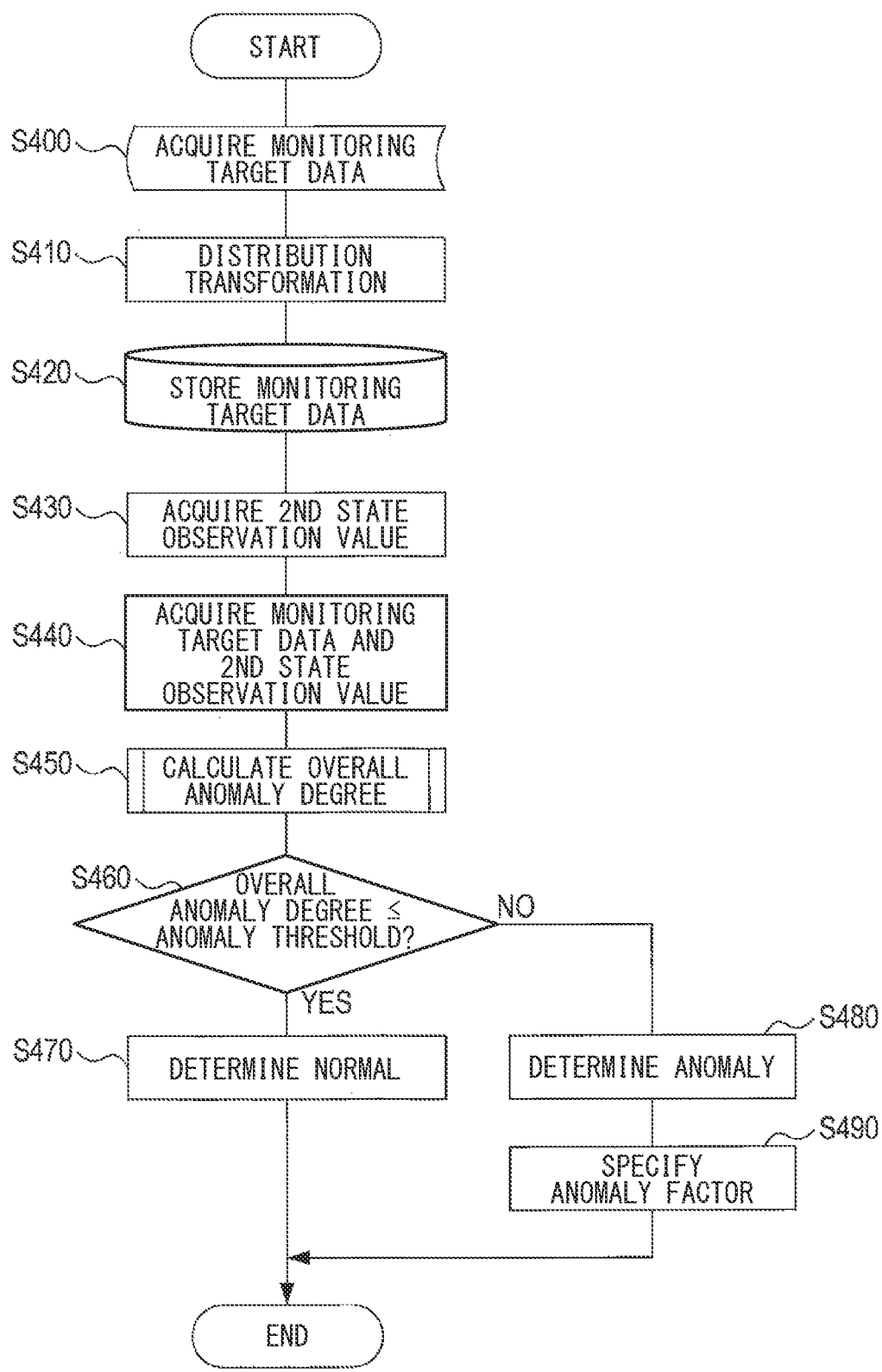
FIG. 11 is a flowchart showing an anomaly determination process according to the second embodiment of the present embodiments.

Next, the anomaly determination process executed by the factor analysis device 100 will be described with reference to the flowchart of FIG. 11.

First, in S400-S440, the same processing as in S200-S240 is executed.

Subsequently, in S450, the anomaly degree calculation unit 108 calculates the overall degree of anomaly C_k. Specifically, the anomaly degree calculation unit 108 calculates the distance D_k as in S250. Then, the overall anomaly degree C._k of the entire systems that the number of systems is X is calculated by add the magnitudes of the X elements from D_k,1, to D_k,X with the distance D_k.

Subsequently, in S460, the determination unit 109 determines whether or not the overall anomaly degree C._k calculated in S450 is equal to or less than the anomaly threshold. The anomaly threshold may be calculated in S70 using the difference between the learning target data and the first state observation value and the neuron weight data.

When it is determined in S460 that the overall anomaly degree C._k is equal to or less than the anomaly threshold, the process proceeds to S470. In S470, the determination unit 109 determines that the vehicle is in a normal state, and terminates this process.

On the other hand, when it is determined in S460 that the overall anomaly degree C._k exceeds the anomaly threshold, the process proceeds to S480. In S480, the determination unit 109 determines that the vehicle is in an anomaly state, and proceeds to the process of S490.

In S490, the factor analysis unit 110 performs the same processing as in S260 and S270, creates and displays a Pareto chart, and identifies an anomaly system among the X systems. Thus, the process is completed.

<2-3. Effects>

According to the second embodiment described above, the following effects are provided in addition to the effects (1) to (3) of the first embodiment described above.

(4) It is possible to recognize the presence or absence of an anomaly in the entire system by calculating the overall anomaly degree C._k of the entire X systems from the sum of the X elements D_k,1, D_k,2, . . . , D_k,X with the distance Dk.

<2-4. Another Example of the Second Embodiment>

Next, an overall anomaly degree calculation process according to another example of the second embodiment will be described with reference to the flowchart of FIG. 12. In this example, the anomaly degree calculation unit 108 executes the flowchart of FIG. 12 instead of the process in S450.

Figure 12:
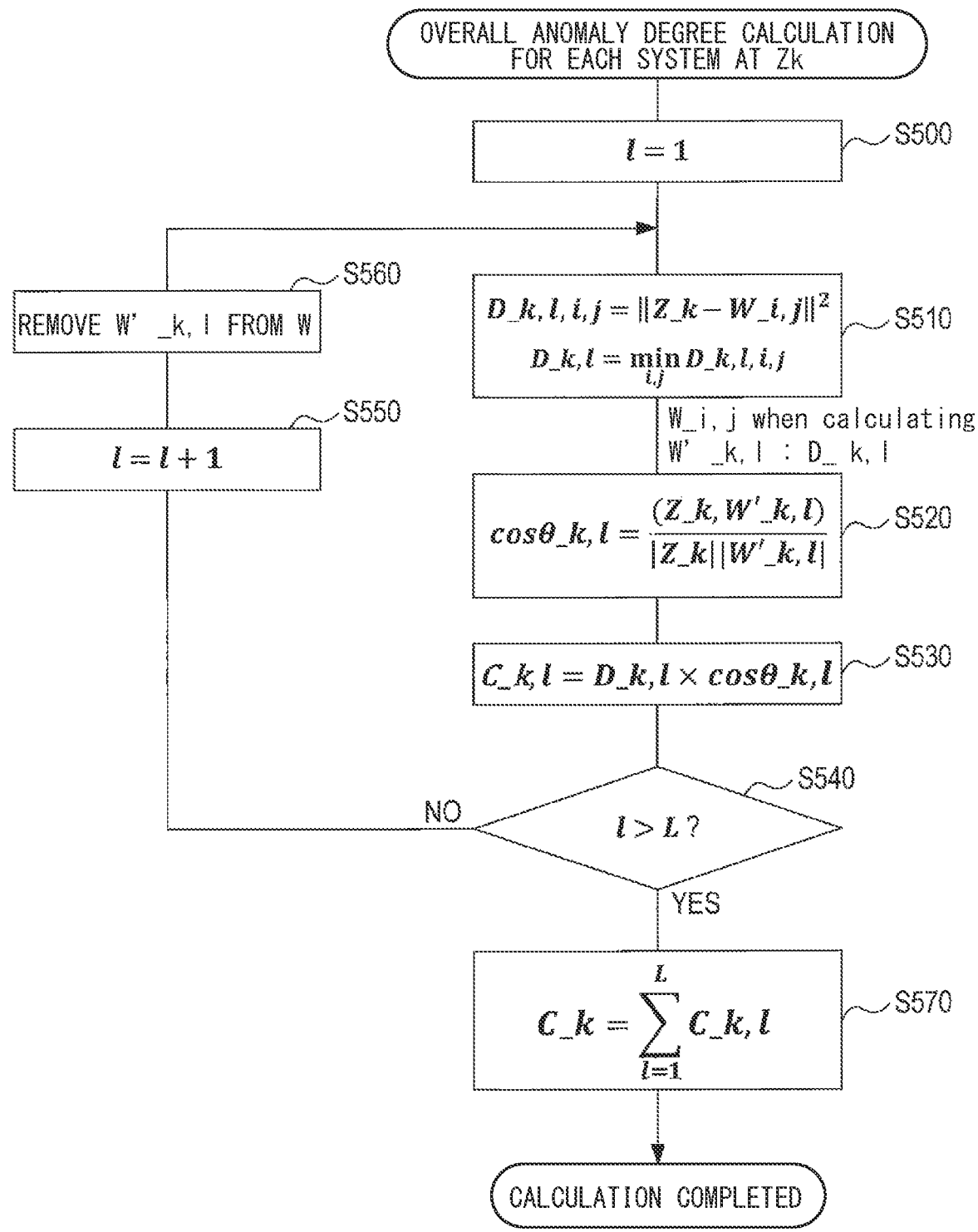
FIG. 12 is a flowchart showing a overall anomaly degree calculation process according to another example of the second embodiment of the present embodiments.

In FIG. 12, the following equations are adopted.

$$W=(W\_1.1, \ldots \ W\_1,M, W\_2,1, \ldots$$
$$W\_i,j, \ldots, \ldots, W\_N,M)$$

$$W\_i,j=(W\_i,j,1, Wi,j,2, \ldots, Wi,j,X)^T$$

$$Z\_k=(Z\_k,1, Z\_k,2, \ldots, Z\_k,X)^T$$

Here, k indicates a measurement time point.

First, in S500 and S510, the same processing as in S300 and S310 is executed to calculate the minimum Euclidean distance D_k,l.

Subsequently, in S520, the cosine similarity degree of cos θ_k,l is calculated from the verification data Z_k and the neuron weight data W'_k,l closest thereto.

Subsequently, in S530, the degree of anomaly C_k,l is calculated from the minimum Euclidean distance D_k,l and the cosine similarity degree of cos θ_k, l.

In S540-S560, the same processing as in S320-S340 is executed. Then, the anomaly degree calculation unit 108 repeats the process of S510 to S560 until the loop counter l exceeds the predetermined value L.

Then, in S570, the overall anomaly degree C._k is calculated by summing up the L anomaly degrees C._k,l. Thus, the process is completed.

Furthermore, a factor analysis process according to another example of the second embodiment will be described.

In the first embodiment, the factor analysis unit 110 identifies an anomaly factor based on the distance between the verification data Z_k of each system and the normal plane. On the other hand, in this example, the factor analysis unit 110 identifies the anomaly factor based on the angle and covariance.

As shown in equations (7) and (8), the factor analysis unit 110 may use the verification data Z_k temporally before, after, or before and after the verification data Z_k determined as the anomaly in S480 as a standard to identify the cause of the anomaly. In this example, the factor analysis unit 110 identifies the cause of the anomaly using 11 points of data, which is prepared by adding 5 points of data before the verification data Z_k determined as the anomaly, 5 points of data after the verification data Z_k determined as the anomaly, and the verification data Z_k. s is a value specifying the monitoring target data and the second state observation value, and an equation of 1≤s≤S is satisfied. S is the total number of monitoring target data and the second state observation value.

When the factor that contributes to the overall anomaly degree is analyzed, if only a small number of monitoring target data is used, it may be difficult to analyze accurately the factor due to the noise. In addition, it may be difficult to ascertain which of the multiple systems has the cause. Therefore, in this example, by analyzing the state observation value using a plurality of measurement points, it is possible to make it robust against noise.

(Equation 7)

$$f\_k=\sqrt{|Z\_k-W\_k|} \tag{7}$$

(Equation 8)

$$f\_k = (f\_k,1, f\_k,2, \ldots f\_k,s)^T \quad (8)$$

Further, the factor analysis unit calculates a similarity degree γ_s using equations (9) and (10). f_all is the sum of values f_k,s, which are the values calculated from each of the second state observers, and indicates the overall anomaly tendency. The degree of similarity γ_s corresponds to the degree of similarity of the anomaly degree of each system to the overall tendency of anomaly f_all. A system with a larger value of the similarity degree γ_s provides a factor that contributes more to the overall anomaly. f' indicates a deviation vector from the average.

(Equation 9)

$$f\_all = \sum_{s}^{T} f\_k, s \quad (9)$$

(Equation 10)

$$\gamma\_s = \frac{(f'\_all, f'\_s)}{\|f'\_all\|\|f'\_s\|} \quad (10)$$

Figure 13:
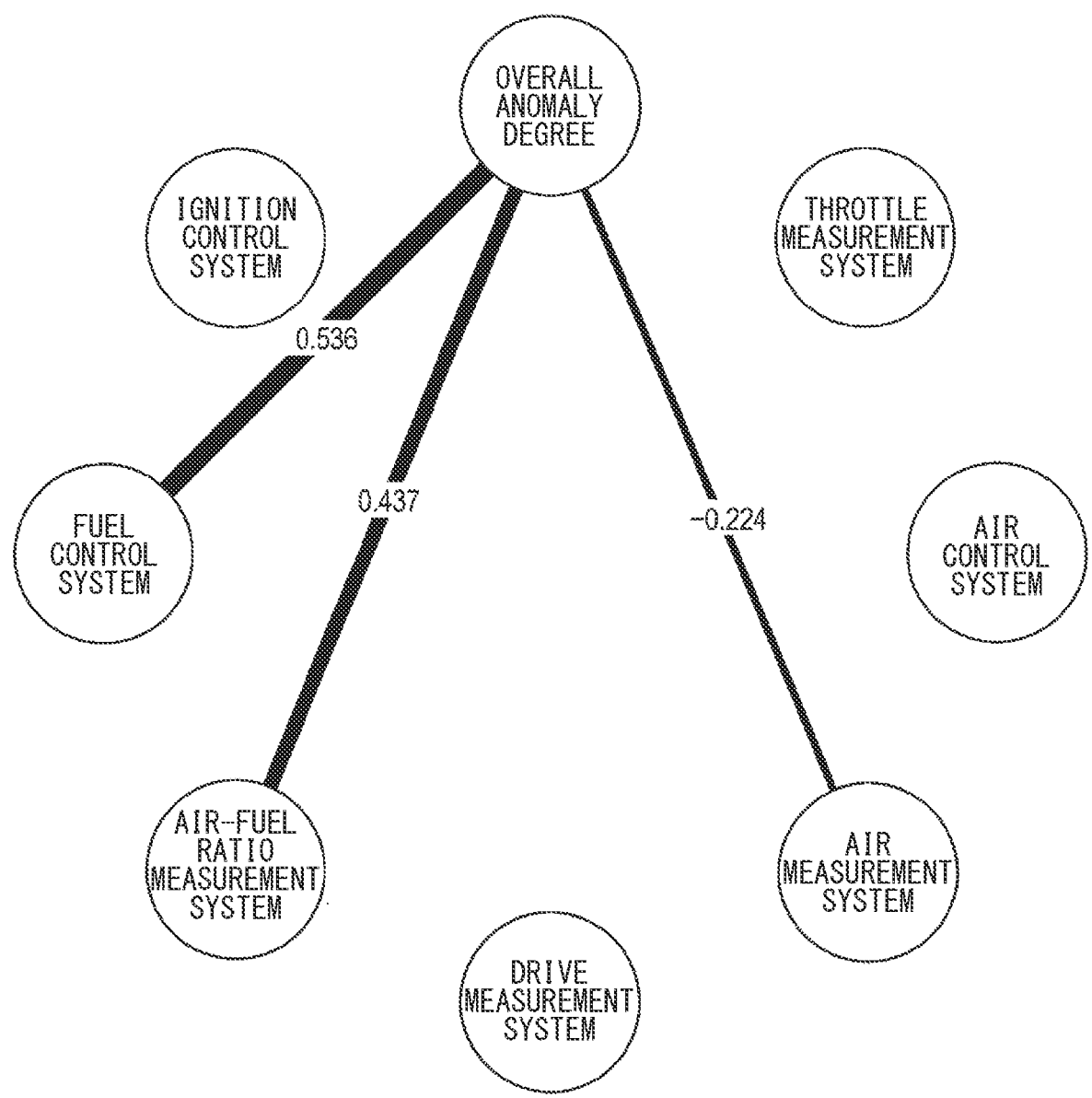
FIG. 13 is a diagram showing analysis results of anomaly factors according to another example of the second embodiment of the present embodiments.

Furthermore, as shown in FIG. 13, the display unit 111 displays a system that greatly contributes to the overall anomaly degree C._k (for example, the similarity degree γ_s is 0.4 or more).

In this example, factors are analyzed based on the angle between the verification data and the normal plane. Therefore, as shown in FIG. 9, when the anomaly data is disposed along the axis of the ignition control system and the angle between the anomaly data and the normal plane is relatively small, even if the distance between the anomaly data and the normal plane is large, the similarity degree γ_s does not increase as shown in FIG. 7. That is, the ignition control system is not identified as the cause of the anomaly. Even in such a case, using the distance between the verification data and the normal plane as shown in FIG. 10, the ignition control system can be identified as the cause of the anomaly.

Also, if the verification data is constant for a predetermined period of time and does not change, the variance of the denominator of Equation (10) is 0, and the similarity degree γ_s cannot be calculated. Therefore, even in such a case, using the distance between the verification data and the normal plane as in the first embodiment, the cause of the anomaly can be specified. Therefore, both the angle and the distance are used to identify the anomaly factor.

OTHER EMBODIMENTS

Although embodiments of the present disclosure have been described above, the present disclosure is not limited to the above-described embodiments but various modifications can be made.

(a) In the first embodiment, the Pareto chart is created based on the distance D_k of each system, alternatively, the present embodiments may not be limited to this feature. Based on the distance D_k of each system, another diagram may be created as long as it shows the contribution of the anomaly degree of each system to the anomaly degree of the entire system.

(b) In the above embodiment, k is a point in time and the monitoring target data Z_k is time-series data, alternatively, the monitoring target data Z_k may not be limited to time-series data. For example, the monitoring target data Z_k may be data of a plurality of vehicles that have passed a certain point. In this case, k identifies an individual vehicle of the plurality of vehicles.

(c) In the above embodiment, the factor analysis device 100 includes the state observer generator 104, the state observer information memory 105, the learning target data memory 102, the normal model generator 106, and the normal model parameter memory 107. Alternatively, it may not be necessary to have all units in the device 100. For example, the factor analysis device 100 may be connected to the state observer information memory 105 and the normal model parameter memory unit 107 via the Internet, and acquire the variable configuration and coefficients of the state observer and the normal model via the Internet.

(d) The factor analysis device 100 and the technique according to the present disclosure may be achieved by a dedicated computer provided by constituting a processor and a memory programmed to execute one or more functions embodied by a computer program. Alternatively, the factor analysis device 100 and the technique according to the present disclosure may be achieved by a dedicated computer provided by constituting a processor with one or more dedicated hardware logic circuits. Alternatively, the factor analysis device 100 and the technique according to the present disclosure may be achieved using one or more dedicated computers constituted by a combination of the processor and the memory programmed to execute one or more functions and the processor with one or more hardware logic circuits. The computer program may be stored in a computer-readable non-transitory tangible storage medium as an instruction to be executed by the computer. The technique for realizing the functions of the respective units included in the factor analysis device 100 does not necessarily need to include software, and all of the functions may be realized with the use of one or multiple hardware.

(e) A plurality of functions of one element in the above embodiment may be implemented by a plurality of elements, or one function of one element may be implemented by a plurality of elements. In addition, multiple functions of multiple components may be realized by one component, or a single function realized by multiple components may be realized by one component. A part of the configuration of the above embodiment may be omitted. Further, at least part of the configuration of the above-described embodiment may be added to or replaced with the configuration of another embodiment described above.

(f) In addition to the factor analysis device described above, the present embodiment may be realized implemented in various forms such as a system having the factor analysis device as a component, a program for making a computer function as the factor analysis device, a non-transitory tangible storage medium such as a semiconductor memory in which this program is recorded, a factor analysis method and the like.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A factor analysis device for analyzing a system that provides an anomaly factor in a vehicle, comprising:
   a model acquisition unit configured to acquire a normal model stored in a memory;
   a monitoring target data acquisition unit configured to acquire monitoring target data of each of a plurality of systems disposed in a device;
   a distance calculation unit configured to calculate a distance between the normal model and a value based on the monitoring target data for each of the plurality of systems; and
   a factor analysis unit configured to:
      calculate differences between the distance for each system and distances for remaining systems;
      add the differences to obtain a sum of the differences;
      create a Pareto chart using the sum of the differences; and
      identify, from among the plurality of systems, a system that provides an anomaly factor based on the Pareto chart; and
   a display unit configured to display the Pareto chart;
   wherein the plurality of systems include at least one of: an ignition control system of the vehicle; a fuel control system of the vehicle; an air measurement system of the vehicle; an air-fuel ratio measurement system of the vehicle; a throttle measurement system of the vehicle; an air control system of the vehicle; and a drive measurement system of the vehicle; and
   wherein the factor analysis device analyzes anomaly factors with high accuracy and analyzes with high accuracy which system of the plurality of systems of the device has an anomaly or has a possibility for an occurrence of an anomaly.

2. The factor analysis device according to claim 1, further comprising:
   an anomaly degree calculation unit configured to calculate an overall anomaly degree of the plurality of systems based on a sum of distances of the plurality of systems.

3. The factor analysis device according to claim 2, wherein:
   the factor analysis unit is configured to identify a system having a large contribution of the anomaly degree of each system with respect to the overall anomaly degree calculated by the anomaly degree calculation unit.

4. The factor analysis device according to claim 1, further comprising:
   a state observer generator configured to generate a state observer;
   a learning target data acquisition unit configured to acquire learning target data of each of the plurality of systems;
   a normal model generator configured to generate the normal model by inputting a value obtained by combining a first state observation value obtained by inputting the learning target data into the state observer and the learning target data into a competitive neural network, wherein:
   the value based on the monitoring target data corresponds to a value obtained by combining a second state observation value obtained by inputting the monitoring target data into the state observer and the monitoring target data.

5. The factor analysis device according to claim 1, further comprising:
   one or more processors; and
   a memory coupled to the one or more processors and storing program instructions that when executed by the one or more processors cause the one or more processors to provide at least: the model acquisition unit; the monitoring target data acquisition unit; the distance calculation unit; and the factor analysis unit.

6. A factor analysis method for analyzing a system that provides an anomaly factor in a vehicle, comprising:
   acquiring a normal model from a memory;
   acquiring a monitoring target data for each of a plurality of systems;
   calculating a distance between the normal model and a value based on the monitoring target data for each of the plurality of systems;
   calculating differences between the distance for each system and distances for remaining systems of the plurality of systems;
   adding the differences to obtain a sum of the differences;
   creating a Pareto chart using the sum of the differences;
   identifying a system that provides an anomaly factor from among the plurality of systems based on the Pareto chart;
   displaying the Pareto chart; and
   analyzing anomaly factors with high accuracy and analyzing with high accuracy which system of the plurality of systems has an anomaly or has a possibility for an occurrence of an anomaly;
   wherein the plurality of systems include at least one of: an ignition control system of the vehicle; a fuel control system of the vehicle; an air measurement system of the vehicle; an air-fuel ratio measurement system of the vehicle; a throttle measurement system of the vehicle; an air control system of the vehicle; and a drive measurement system of the vehicle.

7. A non-transitory computer readable storage medium comprising instructions for execution by a computer for analyzing a system that provides an anomaly factor in a vehicle, the instructions including:
- acquiring a normal model from a memory;
- acquiring a monitoring target data for each of a plurality of systems;
- calculating a distance between the normal model and a value based on the monitoring target data for each of the plurality of systems;
- calculating differences between the distance for each system and distances for remaining systems;
- adding the differences to obtain a sum of the differences;
- creating a Pareto chart using the sum of the differences;
- identifying a system that provides an anomaly factor from among the plurality of systems based on the Pareto chart;
- displaying the Pareto chart; and
- analyzing anomaly factors with high accuracy and analyzing with high accuracy which system of the plurality of systems has an anomaly or has a possibility for an occurrence of an anomaly;
- wherein the plurality of systems include at least one of: an ignition control system of the vehicle; a fuel control system of the vehicle; an air measurement system of the vehicle; an air-fuel ratio measurement system of the vehicle; a throttle measurement system of the vehicle; an air control system of the vehicle; and a drive measurement system of the vehicle.

* * * * *